R. B. CODLING.
BELT COUPLING DEVICE.
APPLICATION FILED OCT. 5, 1911.
1,076,868.
Patented Oct. 28, 1913.
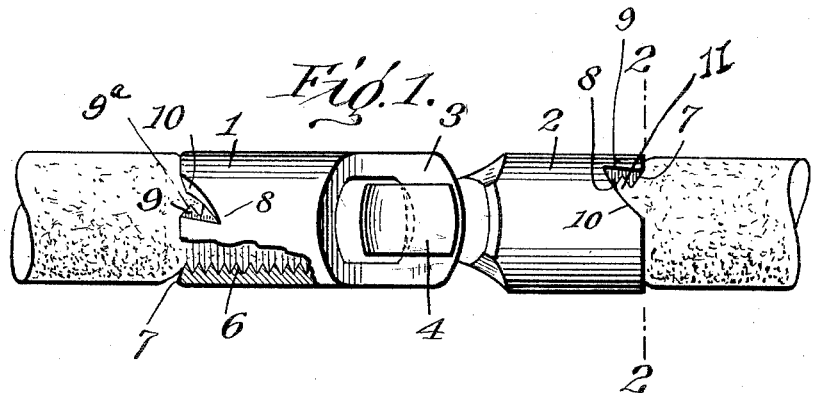
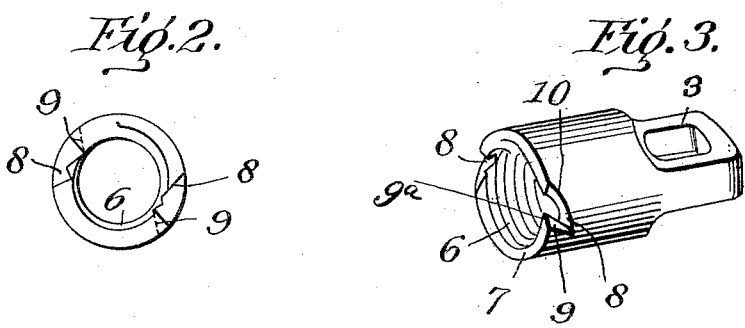
WITNESSES
H. Crocheron
A. Bernstein
INVENTOR
Robert B. Codling
BY
Newell & Neal
ATTORNEYS
COLUMBIA PLANOGRAPH CO., WASHINGTON, D. C.

UNITED STATES PATENT OFFICE.

ROBERT B. CODLING, OF BRISTOL, CONNECTICUT, ASSIGNOR TO THE BRISTOL COMPANY, OF WATERBURY, CONNECTICUT, A CORPORATION OF CONNECTICUT.

BELT-COUPLING DEVICE.

1,076,868.      Specification of Letters Patent.      Patented Oct. 28, 1913.

Application filed October 5, 1911. Serial No. 652,967.

*To all whom it may concern:*

Be it known that I, ROBERT B. CODLING, a citizen of the United States, residing at 200 Goodwin street, Bristol, Connecticut, have invented certain new and useful Improvements in Belt-Coupling Devices, of which the following is a clear, full, and exact description.

My invention relates to an improved coupling device for round belts, and is particularly adapted for sewing machine belts and the like which are constantly lengthened under tension and require repeated shortening.

My coupling device in general comprises two detachably interlocking members, one for each end of the belt, which are adapted to be adjusted more or less on their respective mountings for quickly and easily shortening the belt to precisely the exact length desired, and are also of a special construction whereby each member is securely fastened upon its respective belt ends so as to be practically irremovable therefrom by an ordinary lengthwise pulling strain.

I am aware that various modifications and changes in the particular details of my construction may be made without departing from the full scope of my invention as defined in the claim, and I therefore do not wish to be limited to any of the exact forms of construction shown in my preferred embodiment hereinafter described.

In the drawings, Figure 1 shows the two ends of a belt with the coupling members thereon, one of said members being partly in section; Fig. 2 is a section through line 2—2 of Fig. 1 showing an end view of said coupling member; and Fig. 3 is a detached perspective view of one of the coupling members.

Referring more particularly to the drawings, the coupling device consists of two coupling sleeve members indicated at 1 and 2 respectively, said members having detachably interlocked ends as shown, preferably by having a loop such as 3 formed in one of said members and a hook such as 4 formed in the opposite member. The body of each member is preferably in the form of a sleeve interiorly threaded as shown at 6. The outer edge of the sleeve members is preferably beveled at 7 so as to flare slightly outwardly, and around these beveled forward edges of the sleeve member are formed one or more backwardly-extending notches such as 8. These notches are formed so as to cut their way along the surface of the belt upon which said sleeve member is mounted, and together with the internal threads 6 as shown cause the sleeve member to act as a threading die for cutting its own thread upon the end of the belt when the same is turned forcibly thereon. I prefer to make the notches of V form and cut them through the circumferential wall so that the notch is approximately in a plane tangent to the bore of the coupling sleeve. The widest point of the notch may be at the end of the sleeve. The edges 9 and 10 of the coupling preferably converge in a longitudinal direction on the side of the sleeve, and the central axis of the V which the notch forms is preferably inclined with respect to the axis of the cylinder which constitutes the sleeve. The notches are relatively wide measuring circumferentially. This arrangement facilitates the introduction of an excessively large belt and that in turn increases the holding power of the sleeve.

In one aspect the coupling sleeve may be considered as having one or more teeth 9ª projecting circumferentially, one side edge of each tooth being formed by the end of the sleeve, and the other edge being formed by one edge of the adjacent notch.

The particular feature of the present improvement is to form a sleeve member with a cutting notch or notches so that it will not cut its way too freely upon the end of the belt, but will cut just sufficient to allow being forced thereon, whereby it will have a tendency to crowd itself over the end of the belt and grip the same with great tenacity to thereby provide a very secure fastening. For this purpose the notches are preferably formed as shown, whereby they are not sufficiently undercut to provide a too free cutting of the thread, but preferably have one face such as 9 beveled at a very slight backward angle from the radius of said sleeve member so as to serve as a cutting edge, the other face 10 of said notch being also beveled outwardly as shown, so as to provide an escape for the cut material 11, shown more clearly at the right-hand side of Fig. 1. My belt coupling members work most advantageously when they are turned so as to secure themselves upon the end of a belt which is slightly larger in diameter than the interior diameter of said sleeve member, whereby this crowding effect of the sleeve over the end of the belt before-mentioned, is greatly increased to make a more secure fastening. In other words, the die cutting effect of my sleeve member reduces the belt in diameter sufficiently to true it to the interior diameter of the coupling.

I have preferably shown the notches with their cutting faces beveled at slight backward angle to the radius of said sleeve member, for it will be understood that the nearer said cutting edges approach said radius the more perpendicular they become to the material of said belt, whereby a scraping effect rather than a cutting effect is produced. This is found desirable in obtaining the crowding effect over the end of the belt and this crowding effect may be still further increased by forming a hooking top to the notch, that is having this cutting edge beveled backward and inwardly from its peripheral edge. In this way most of the cutting will take place at the top or peripheral edge of said notch, the lower beveled portion merely crowding itself over the belt.

The notches 8 are of considerable width at the end of the sleeve, that is, at the point where the belt is forced into the coupling. For this reason the notches form gaps in the wall sufficiently large to permit relief to the pressure of the belt on the wall of the sleeve between the gaps. In other words, the gaps permit a lateral expansion of a portion of the material of the belt, thereby effecting a corresponding reduction in the virtual diameter of the end of the belt as it is being forced into the sleeve. This greatly facilitates the introduction of the belt. Furthermore, on account of the tapering width of the notches to the vertex of the V, the degree of this relief gradually reduces so as to increase the holding action of the threads near the vertex of the notches and there-beyond. The relatively large size of the notches or gaps is therefore important to permit the expansion of the material into them, and their shape is important as effecting a securing of the belt after it has been introduced.

What I claim is:—

A belt coupling consisting of an interiorly threaded metallic sleeve, adapted to screw upon a round belt and having a notch of considerable extent circumferentially in the edge and extending into the body of the sleeve, one side of said notch being sharpened and extending rearwardly with respect to the direction of rotation whereby when the coupling is screwed upon the belt the sharpened edge will act as a cutting edge, and said notch will assist in wedging the belt into said sleeve, said sleeve also having at the other end thereof a part by which it may be attached to another coupling.

Signed at Bristol, Conn. this 29" day of Sept. 1911.

ROBERT B. CODLING.

Witnesses:
ROBERT CARLSON,
WILLIAM L. NEUBAUER.

Copies of this patent may be obtained for five cents each, by addressing the "Commissioner of Patents, Washington, D. C."